(12) United States Patent
Kent et al.

(10) Patent No.: US 7,959,874 B2
(45) Date of Patent: Jun. 14, 2011

(54) HANDHELD AND/OR MOUNTABLE FLUID-EJECTION DEVICE HAVING REMOVABLE TIP WITH CAP

(75) Inventors: Blair M. Kent, Camas, WA (US); Manish Giri, Corvallis, OR (US); Preston Seu, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 937 days.

(21) Appl. No.: 11/738,427

(22) Filed: Apr. 20, 2007

(65) Prior Publication Data

US 2008/0260590 A1    Oct. 23, 2008

(51) Int. Cl.
*B01L 3/00* (2006.01)
(52) U.S. Cl. ....................................................... 422/501
(58) Field of Classification Search .................. 422/100, 422/501
See application file for complete search history.

(56) References Cited

U.S. PATENT DOCUMENTS 7,578,591 B2 * 8/2009 Kent et al. ...................... 347/109
2003/0117456 A1 * 6/2003 Silverbrook et al. ............ 347/40

FOREIGN PATENT DOCUMENTS

JP    09277611    * 10/1997

OTHER PUBLICATIONS

English Machine Translation of JP 09-277611. Date: Mar. 22, 2010.*

* cited by examiner

*Primary Examiner* — Bobby Ramdhanie (57) ABSTRACT

A fluid-ejection device includes a handheld and/or mountable enclosure, a removable tip, a cap, a pneumatic fitting, and a controller. The removable tip has a fluid-ejection mechanism located at an end thereof. The cap is disposed on the end of the removable tip such that just the fluid-ejection mechanism is exposed through the cap. The pneumatic fitting extends from the enclosure and is receptive to placement of the removable tip thereon. The controller is situated within the enclosure to cause the removable tip to eject fluid.

5 Claims, 8 Drawing Sheets

HANDHELD AND/OR MOUNTABLE FLUID-EJECTION DEVICE HAVING REMOVABLE TIP WITH CAP

BACKGROUND

In laboratory and other environments, it is often desired to transfer small amounts of fluid from one location to another. This process is sometimes referred to as "aspirate and dispense," in that fluid is aspirated into a dispensing device at one location, and the dispensing device is moved to another location at which the device dispenses the fluid. The amounts of fluid that may be desired to be transferred in this way can include just nanoliters or picoliters of fluid.

Existing transferring techniques can be disadvantageous, however. So-called pin tools enable fluid to be transferred in volumes as small as nanoliters, but these devices are relatively expensive, and permit just a signal volume of fluid to be transferred at a given time. Micropipettes, by comparison, are less expensive, but they cannot dispense volumes of fluid smaller than microliters with any precision. Piezo-capillary devices are another type of device that can dispense small volumes of fluid, as small as nanoliters, but these devices are also relatively expensive.

DETAILED DESCRIPTION OF THE DRAWINGS

Fluid-ejection Device with Removable Tip

Figure 1:
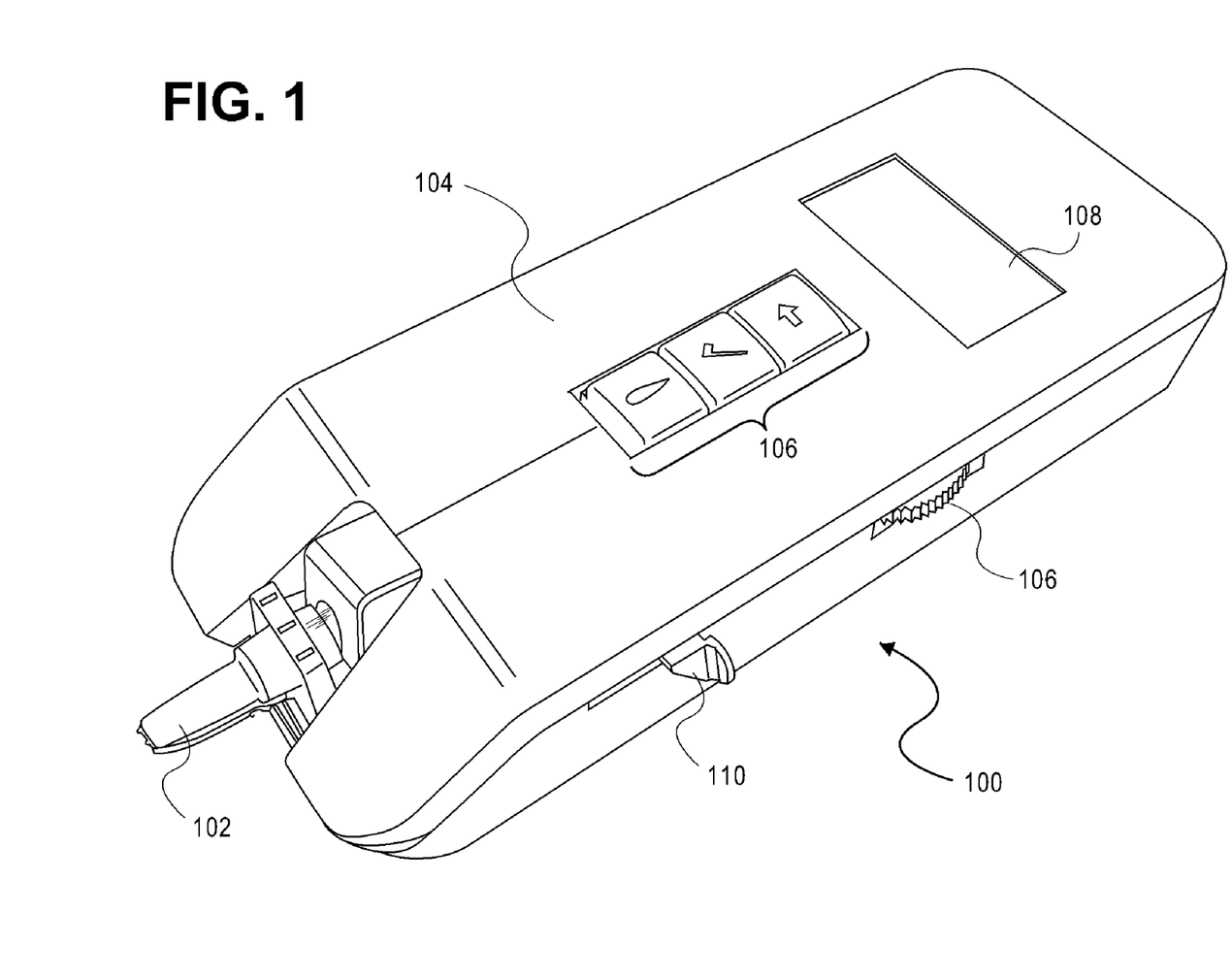
FIG. 1 is a diagram of a handheld and/or mountable fluid-ejection device on which a removable tip has been placed, according to an embodiment of the invention.

FIG. 1 shows a handheld and/or mountable fluid-ejection device 100 on which a removable tip 102 has been placed, according to an embodiment of the invention. The fluid-ejection device 100 is mountable in that it can be attached to a wall, bracket, or other object via screws, adhesive, or other mounting mechanisms. The fluid-ejection device 100 is handheld in that it can be easily held in place over a desired location by a user with just one hand while the device 100 is causing the tip 102 to eject one or more drops of fluid. The fluid-ejection device 100 is consistent with that described in more detail in the pending patent application entitled "Handheld and/or mountable fluid-ejection device receptive to tip containing fluid and fluid-ejection mechanism," filed on Sep. 14, 2006, and assigned Ser. No. 11/532,046, which is hereby incorporated by reference.

The fluid-ejection device 100 includes an enclosure 104, which is the part of the device 100 that is handheld and/or mountable. The enclosure 104 may be fabricated from plastic or another type of material. The fluid-ejection device 100 includes a user interface made up of a number of user-actuable controls 106 and a display 108. The controls 106 may be buttons and/or scroll wheels that are disposed within and extend through the enclosure 104, such that they are externally exposed as depicted in FIG. 1. The display 108 may be a liquid-crystal display (LCD), or another type of display, and is also disposed within and extends through the enclosure 104, such that it is externally exposed as well.

The fluid-ejection device 100 uses the display 108 to display information regarding the removable tip 102 placed on the device 100, among other types of information. The user is able to use the fluid-ejection device 100 to eject fluid from the tip 102 via the controls 106, with informational feedback provided on the display 108. The user can use the device 100 to eject fluid from the tip 102 on a stand-alone basis, without the fluid-ejection device 100 being connected to another device, such as a host device like a desktop or laptop computer, a digital camera, and so on. That is, the device 100 can be intended for use on a completely stand-alone basis, where the user controls fluid ejection from the tip 102 placed on the device 100 without having to connect the device 100 to a host device.

The fluid-ejection device 100 further includes an ejection control 110. User actuation of the ejection control 110 causes the removable tip 102 to be ejected from the fluid-ejection device 100, without the user having to directly pull or pry the tip 102 from the device 100. In this way, if the tip 102 contains a caustic or other type of fluid with which user contact is desirably not made it can be disposed of by simply positioning the fluid-ejection device 100 over a proper waste receptacle and ejecting the tip 102 from the device 100 into the waste receptacle.

The removable tip 102 placed on the fluid-ejection device 100 contains the fluid to be ejected and the actual fluid-ejection mechanism, such as an inkjet printhead. That is, the fluid-ejection device 100 in at least some embodiments does not store any supply of fluid, and does not perform the actual fluid ejection, but rather causes the tip 102 to eject the fluid from its fluid-ejection mechanism. In this way, the fluid-ejection device 100 can remain free of contact with the fluid ejected from the tip 102, even during ejection of the fluid by the tip 102.

As such, the fluid-ejection device 100 is likely not ever contaminated with fluid, and thus different removable tips containing different fluids and/or different types of fluid-ejection mechanisms can easily be switched off and on the device 100 to eject these different fluids in different ways, without having to clean the fluid-ejection device 100. In general, the fluid-ejection device 100 having the tip 102 placed thereon is able to cause ejection of fluid from the tip 102 in drops having volumes measurable in picoliters. For example, the drops may be between 2-300 picoliters, or even between 1-500 picoliters, in volume.

Figure 2:
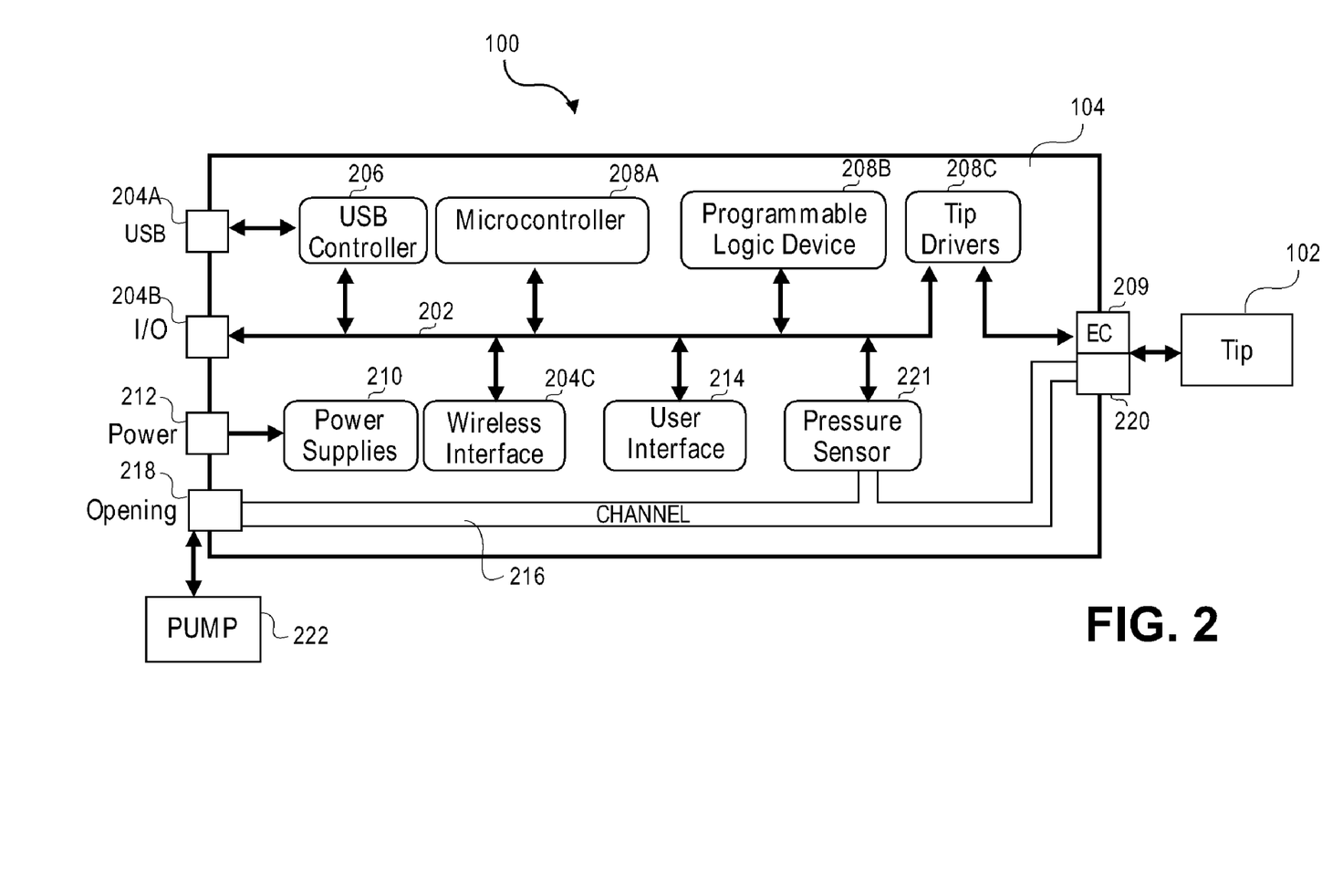
FIG. 2 is a functional diagram of the components of a fluid-ejection device on which a removable tip can be placed, according to an embodiment of the invention.

FIG. 2 shows a functional block diagram of the fluid-ejection device 100 depicting at least some of the constituent components of the device 100, according to an embodiment of the invention. The components of the fluid-ejection device 100 as described in relation to FIG. 2 are disposed at, reside within, and/or extend through the enclosure 104 of the device 100. The fluid-ejection device 100 may have other components, in addition to and/or in lieu of those depicted in FIG. 2, and the device 100 may not have all the components shown in FIG. 2 in some embodiments of the invention.

The fluid-ejection device 100 includes a communication bus 202. Indirectly or directly connected to the communication bus 202 are a number of interfaces 204A, 204B, and 204C, collectively referred to as the interfaces 204, of the fluid-ejection device 100. The interface 204A is a Universal Serial Bus (USB) interface, as known within the art, which connects to the communication bus 202 via a USB controller 206 of the fluid-ejection device 100. The USB controller 206 is a specialized hardware component to provide for USB communications. The interface 204B is a general input/output (I/O) interface, and may be a serial interface, such as an RS-232, RS-422, or RS-485 interface, a 1-Wire® interface, as known within the art, or another type of I/O interface. The interface 204C is a wireless interface, such as a Wi-Fi, 802.11a, 802.11b, 802.11g, 802.11n, and/or a Bluetooth wireless interface, or another type of wireless interface.

The interfaces 204 at the enclosure 104 enable the fluid-ejection device 100 to be communicatively coupled to another device to control ejection of fluid by the removable tip 102, and/or to receive information regarding the tip 102 placed on the device 100, among other types of information. The fluid-ejection device 100 can be employed on a stand-alone basis without being communicatively coupled to another device to cause the tip 102 to eject fluid. However, in another embodiment, the interfaces 204 enable other devices to communicatively couple to the fluid-ejection device so that these other devices effectively control ejection of fluid by the tip 102. These other devices may include computing devices, such as laptop or desktop computers, as well as more specialized types of devices.

The fluid-ejection device 100 also includes a number of controller components 208A, 208B, and 208C, collectively referred to as the controller components 208, situated within the enclosure 104, and communicatively coupled to the communication bus 202. The controller components 208 may constitute what is referred to herein as a controller. Generally, the controller is that which causes the removable tip 102 to eject fluid. More specifically, the controller component 208A is a general-purpose, readily available microcontroller that is employed to handle most slower-speed communications and functionality within the fluid-ejection device 100. By comparison, the controller component 208B is a programmable logic device (PLD) that is employed to handle faster-speed communications and functionality within the fluid-ejection device 100, as may be needed, for instance, to accommodate for the relatively fast triggering of the fluid-ejection mechanism of the tip 102 to eject fluid.

While the functionality of the controller component 208B can be subsumed into the controller component 208A, it is desirable to breakout the functionality of the controller component 208B separately, or otherwise the controller component 208A would have to be a more expensive, faster-speed microcontroller. Likewise, the functionality of the controller component 208A can be subsumed into the controller component 208B, but it is desirable to breakout the functionality of the controller component 208A separately. This is because the controller component 208B is a relatively more expensive PLD that would have to be even more expensive if it were to include the functionality of the controller component 208A.

The controller component 208A may include a table that describes the different types of removable tips that may be placed on the fluid-ejection device 100. Such a table includes entries corresponding to how much current, voltage, energy, or power to deliver to a given type of tip to cause it eject fluid, how long such current, voltage, energy or power should be delivered to result in a given type of tip to eject fluid, and so on. More generally, the entries of the table describe parameters as to how different types of tips are to be signaled so that they properly eject fluid under the control of the fluid-ejection device 100.

Furthermore, the controller component 208C can be considered as including tip drivers. These tip drivers may be a set of hardware devices or components for buffering signals passed to and from the removable tip 102 in relation to the fluid-ejection device 100. The fluid-ejection device 100 is electrically connected to the tip 102 via an electrical connector 209. More specifically, the communication bus 202 of the fluid-ejection device 100 is connected to the tip 102, through the controller component 208C, via the electrical connector 209. Communications signals from the fluid-ejection device 100 are transmitted to and received from the tip 102 via the electrical connector 209. Furthermore, power is provided to the fluid-ejection mechanism of the tip 102 from the fluid-ejection device 100 via the electrical connector 209.

The fluid-ejection device 100 is further depicted in FIG. 2 as including a power supply 210 within the enclosure 104, and that is connectable to a power interface 212 extending through the enclosure 104. The power supply 210 provides power to the components of the fluid-ejection device 100 as supplied by an external power source through a power cable connected to the power interface 212. Alternatively, the power supply 210 may be external to the enclosure 104 of the fluid-ejection device 100. Furthermore, the power supply 210 may in one embodiment include one or more rechargeable and/or non-rechargeable batteries, in addition to and/or in lieu of being connectable to an outside power source via a power cable connected to an external power source.

The fluid-ejection device 100 is also depicted in FIG. 2 as including a user interface component 214. The user interface component 214 resides or is disposed within the enclosure 104, and/or extends through the enclosure 104. The user interface component 214 includes the controls 106 and the display 108 of FIG. 1 that have been described, and is communicatively connected to the communication bus 202.

The fluid-ejection device 100 includes a gas channel 216 disposed or situated within the enclosure 104. The gas channel 216 may be externally exposed at an opening 218 within the enclosure 104 of the fluid-ejection device 100. At the other end, the gas channel 216 ends at a pneumatic fitting 220 to which the removable tip 102 is pneumatically connected. When the fluid is ejected from the tip 102, the fluid can be effectively replaced within the tip 102 with air (or another gas) supplied via the channel 216 from the opening 218, as can be appreciated by those of ordinary skill within the art. Otherwise, undesired negative air (or gas) pressure may build up within the tip 102 as its supply of fluid is ejected.

Generally, where the fluid-ejection device 100 is operated within a conventional environment, the gas supplied via the channel 216 is air from this environment. However, in other environments, the fluid-ejection device 100 may be operated such that the surrounding gas is other than air. For instance, such an environment may be constrained to an inert gas, such that the gas supplied via the channel 216 is this inert gas.

The gas channel 216 is fluidically, or pneumatically, connected to a pressure sensor 221 also disposed or situated within the enclosure 104 of the fluid-ejection device 100, and communicatively coupled to the communication bus 202. The pressure sensor 221 measures the air, or gas, pressure against the fluid within the removable tip 102 via the fluidic connection of the channel 216 with the tip 102 through the pneumatic fitting 220. The pressure sensor 221 can thus measure if there is positive air (or gas) pressure or negative air (or gas) pressure against the fluid within the tip 102.

The gas channel 216 may also be fluidically, or pneumatically, connected to a pump 222. The pump 222 is depicted as being external to the enclosure 104 of the fluid-ejection device 100, and fluidically, or pneumatically, coupled at the opening 218. Alternatively, the pump 222 may be internal to the enclosure 104 of the fluid-ejection device 100. In either case, the pump 222 may in one embodiment be considered part of the fluid-ejection device 100. The pump 222 can be employed to create positive pressure against the fluid contained within the removable tip 102, by pumping air (or another gas) to the tip 102 via the pneumatic fitting 220 through the channel 216. The pump 222 can also be employed to create negative pressure against the fluid contained within the tip 102, by pumping air (or another gas) from the tip 102 via the pneumatic fitting 220 through the channel 216.

Removable Tip with Cap

Figure 3:
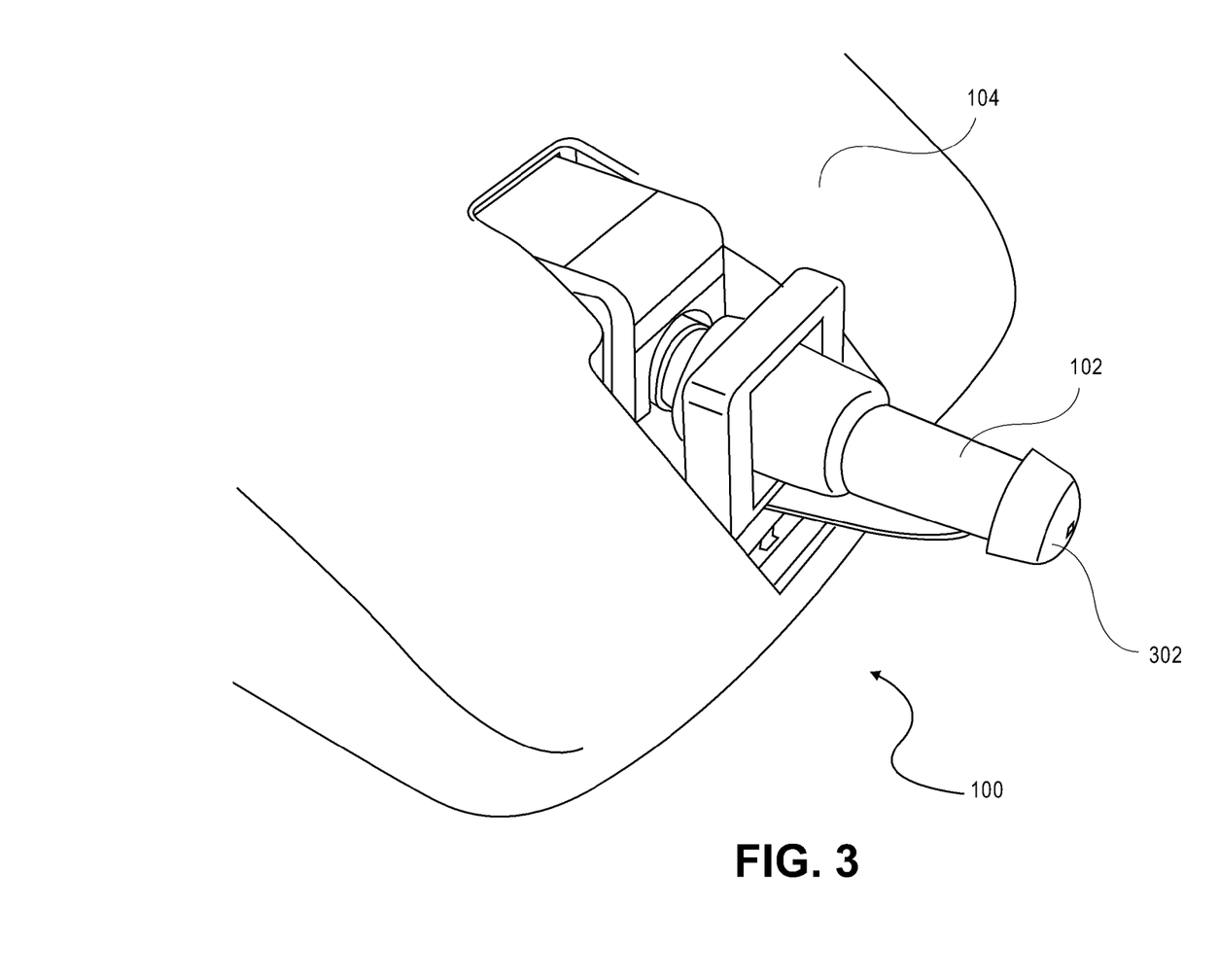
FIG. 3 is a diagram of a fluid-ejection device on which a cap has been disposed on a removable tip of the device, according to an embodiment of the invention.

FIG. 3 shows a portion of the fluid-ejection device 100 in which the removable tip 102 has mounted or disposed thereon a cap 302, according to an embodiment of the invention. The cap 302 may be fabricated from the same material as the removable tip 102 in one embodiment of the invention, such as plastic or another material. The removable tip 102 together with the cap 302 may be referred to as the removable tip assembly. The cap 302 may be mounted on the removable tip 102 such that it is permanently affixed to the tip 102. For example, a two-part epoxy or another type of adhesive may be employed to mount the cap 302 on the removable tip 102.

Figure 4A:
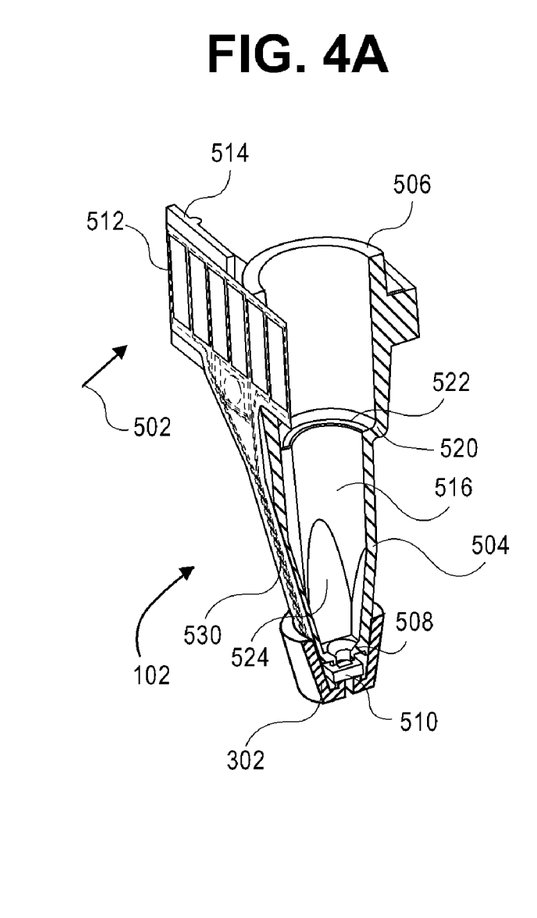
FIGS. 4A and 4B are diagrams of a removable tip in detail on which a cap is disposed and which is to be placed on a fluid-ejection device, according to an embodiment of the invention.
Figure 4B:
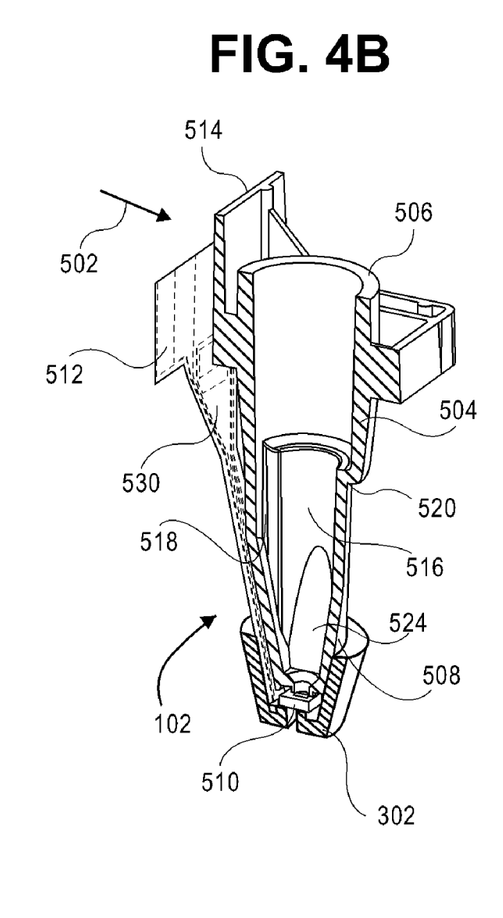

FIGS. 4A and 4B show partial cutaway views of the removable tip 102 for placement on the fluid-ejection device 100 in detail, and on which the cap 302 is disposed, according to an embodiment of the invention. Both FIGS. 4A and 4B are oriented in relation to the arrow 502, which is pointed towards a particular side of the tip 102. The tip 102 includes a substantially hollow body 504 to contain a supply of fluid. The body 504 includes a first end 506 and a second end 508. The body 504 of the tip 104 tapers from the first end 506 to the second end 508. The first end 506 corresponds to the pneumatic fitting 220 of the fluid-ejection device 100. The tip 102 is placed on the fluid-ejection device 100 such that the first end 506 of the tip 102 is placed on the pneumatic fitting 220 of the device 100.

The removable tip 102 further includes a fluid-ejection mechanism 510 situated or disposed at the second end 508 of the body 504 of the tip 102. The fluid-ejection mechanism 510 may be an inkjet printhead-like fluid-ejection mechanism, for instance, containing a smaller number of individual fluid-ejection nozzles, or orifices, than is typically found on an inkjet printhead. The fluid-ejection mechanism 510 ejects the fluid contained within the body 504 therefrom, outwards from the tip 102, such as via the nozzles or orifices thereof.

The removable tip 102 also includes an electrical connector 512. The electrical connector 512 is electrically connected to the fluid-ejection mechanism 510 of the tip 102 via a flexible circuit 530 running the between the former and the latter. The electrical connector 512 corresponds to the electrical connector 209 of the fluid-ejection device 100. Thus, the electrical connector 512 electrically couples to the electrical connector 209, so that the fluid-ejection device 100 is able to control ejection of the fluid contained within the tip 102 by the fluid-ejection mechanism 510. The electrical connector 512 is mounted on a flat tab 514 of the tip 102 that is at least substantially parallel to a centerline of the body 504.

The body 504 of the removable tip 102 includes a primary channel 516 between the first end 506 and the second end 508. The primary channel 516 is the primary manner by which fluid introduced at the first end 506 of the body 504 is delivered to the fluid-ejection mechanism 510 at the second end 506 of the body 504, such as by gravity. The body 504 also includes a secondary channel 518, called out only in FIG. 4B, between the first end 506 and the second end 508. The secondary channel 518 may be a secondary manner by which fluid introduced at the first end 506 is delivered to the fluid-ejection mechanism 510 at the second end 506. The secondary channel 518 is smaller than the primary channel 516, and is located to a side of the primary channel 516.

Furthermore, the secondary channel 518 within the body 504 of the removable tip 102 promotes the escaping of trapped gas, such as air, during delivery of the fluid to the fluid-ejection mechanism 510 at the second end 508 of the body 504. That is, while the fluid is moving within the body 504 from the first end 506 to the fluid-ejection mechanism 510 at the second end 508, air or other gas can become trapped, which can result in undesired bubbles within the fluid. The presence of the secondary channel 518 substantially alleviates this trapped gas, by providing a route by which such undesired bubbles can escape. Trapped gas is undesirable because it can result in a pocket of gas at the fluid-ejection mechanism 510, such that the fluid-ejection mechanism 510 can be starved of fluid to eject therefrom, even though there is fluid contained within the body 504 itself.

The cap 302 is mounted on the removable tip 102 at the end 508 of the hollow body 504 of the tip 102. The cap 302 exposes just the fluid-ejection mechanism 510 therethrough. The cap 302 is adhesively sealed to the end 508 of the tip 102 such that fluid coming into contact with the cap 302 and the fluid-ejection mechanism 510 is unable to migrate between the mechanism 510 and the cap 302. That is, the cap 302 is sealed around the fluid-ejection mechanism 510. The cap 302 covers the portion of the flexible circuit 530 at the end 508 of the tip 102. But for the cap 302, this portion of the flexible circuit 530 would otherwise be exposed at the end 508 of the tip 102. As such, the cap 302 prevents the flexible circuit 530 at the end 508 of the tip 102 from coming into contact with any fluid.

Figure 5:
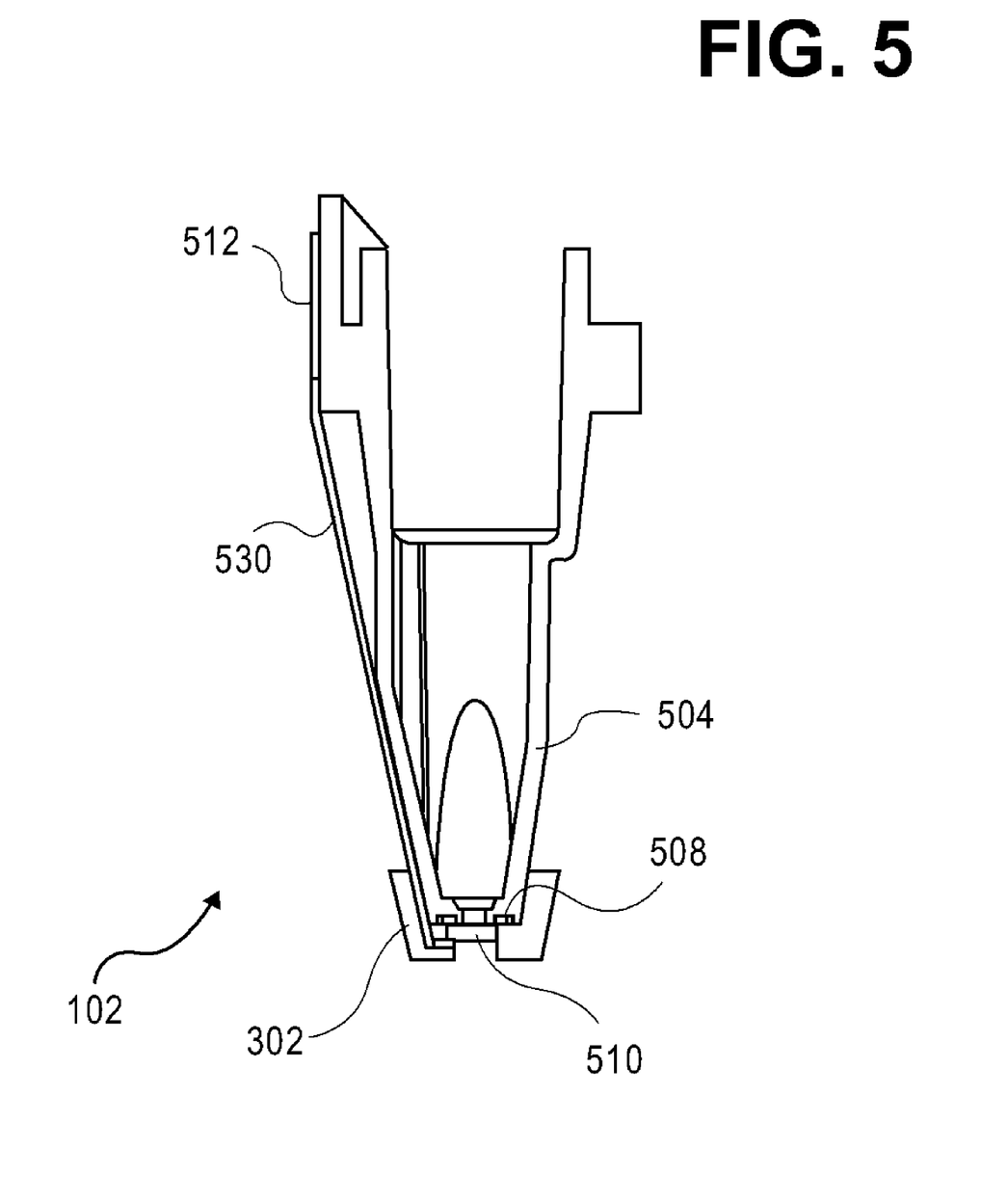
FIG. 5 is a diagram of a side view of a removable tip in detail on which a cap is disposed and which is to be placed on a fluid-ejection device, according to an embodiment of the invention.

FIG. 5 shows a side cutaway view of the removable tip 102 that further shows how the cap 302 is mounted at the end 508 of the hollow body 504 of the tip 102, according to an embodiment of the invention. In particular, FIG. 5 shows in detail how the cap 302 covers the portion of the flexible circuit 530 at the end 508 of the tip 102, where the circuit 530 electrically couples the electrical connector 512 with the fluid-ejection mechanism 510. FIG. 5 also shows in detail how the cap 302 exposes just the fluid-ejection mechanism 510.

The external surface of the cap 302 in one embodiment is at least substantially hydrophobic, such that it is non-wetting and repels fluid. The material from which the cap 302 is fabricated may itself be intrinsically hydrophobic. Alternatively, the external surface of the cap 302 may be treated with an at least substantially hydrophobic material, such as vapor-deposited trichlorosilane, or another type of hydrophobic material, to render the external surface of the cap 302 at least substantially hydrophobic.

Mounting the cap 302 on the removable tip 102 is advantageous for at least a number of different reasons. Because the cap 302 covers the flexible circuit 530 at the end 508 of the hollow body 504, the flexible circuit 530 does not come into contact with fluid when, for instance, the tip 102 is dipped into a supply of fluid. As such, fluid does not wick up the flexible circuit 530, so that less, if any, of the fluid is wasted, which can be significant where the fluid is expensive.

Likewise, because the cap 302 exposes just the fluid-ejection mechanism 510 at the end 508 of the removable tip 102, and seals around the fluid-ejection mechanism 510, dipping the tip 102 into a supply of fluid results in at most just the cap 302 and the mechanism 510 coming into contact with the fluid. That is, positioning the end 508 of the tip 102 adjacent to and touching a supply of fluid to aspirate fluid into the tip 102 results in just the cap 302 and the fluid-ejection mechanism 510 coming into contact with the supply of fluid. In this way, fluid wastage is also reduced. Furthermore, where the cap 302 is at least substantially hydrophobic, the fluid is less likely to adhere to the cap 302, which further decreases potential wastage of the fluid.

Figure 6:
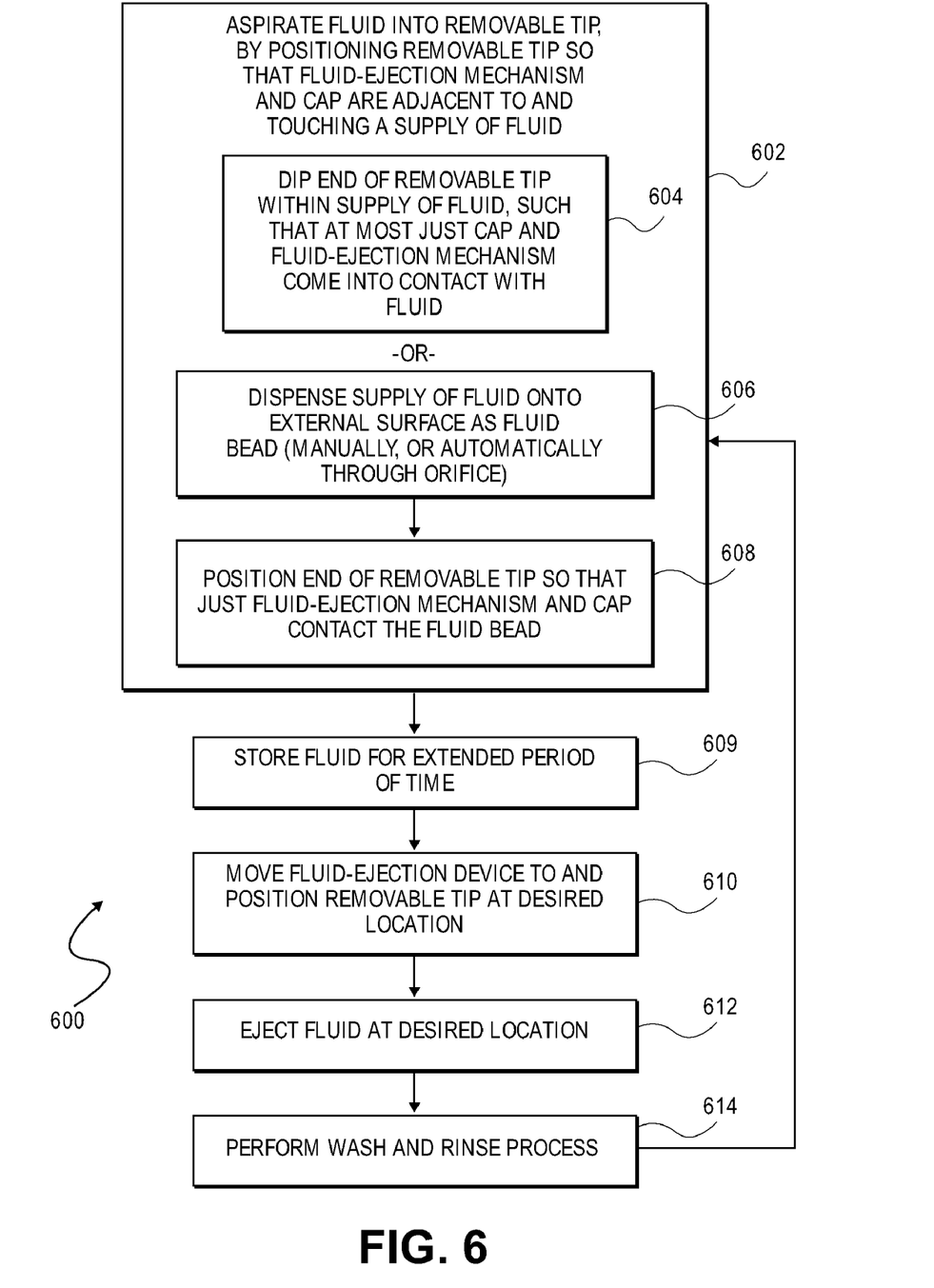
FIG. 6 is a flowchart of a method for aspirating and dispensing fluid using a fluid-ejection device having a removable tip on which a cap has been mounted, according to an embodiment of the invention.

Aspiration and Dispensing of Fluid Using Fluid-ejection Device with Tip Having Cap FIG. 6 shows a method 600 for aspirating and dispensing fluid using the fluid-ejection device 100, on which the removable tip 102 has been placed, and where the removable tip 102 has the cap 302 mounted thereon, according to an embodiment of the invention. That is, the method 600 is for transferring fluid using the fluid-ejection device 100 from one location to another, in volumes that can be as small as picoliters. Fluid is aspirated into the removable tip 102 of the fluid-ejection device 100 (602), where the removable tip 102 has the cap 302 mounted thereon. Specifically, the removable tip 102 is positioned so that the fluid-ejection mechanism 510 and the tip 102 are positioned adjacent to and touching a supply of fluid. Backpressure within the tip 102 may then cause the fluid to be transferred into the tip 102, or natural wicking action may result in the fluid being transferred into the tip 102.

In one embodiment, the fluid can be aspirated into the removable tip 102 from a microtiter plate, a wellplate, or another type of microplate. These types of plates are flat plates that have multiple wells that are used as small test tubes. Such microplates have become standard tools within analytical research and clinical testing laboratories. A microplate typically has 6, 24, 96, 384, or even 1536 or more sample wells arranged in a rectangular matrix. Each well of a microplate typically contains between a few to a few hundred microliters of fluid.

In one embodiment, aspiration of fluid into the removable tip 102 is accomplished via backpressure control. Thus, the pressure within the removable tip 102 is regulated to provide a negative pressure to suck fluid into the removable tip 102. After the fluid has been aspirated into the removable tip 102, this backpressure can be reduced, but still present to prevent undesirable drooling of the fluid from the tip 102.

Figure 7:
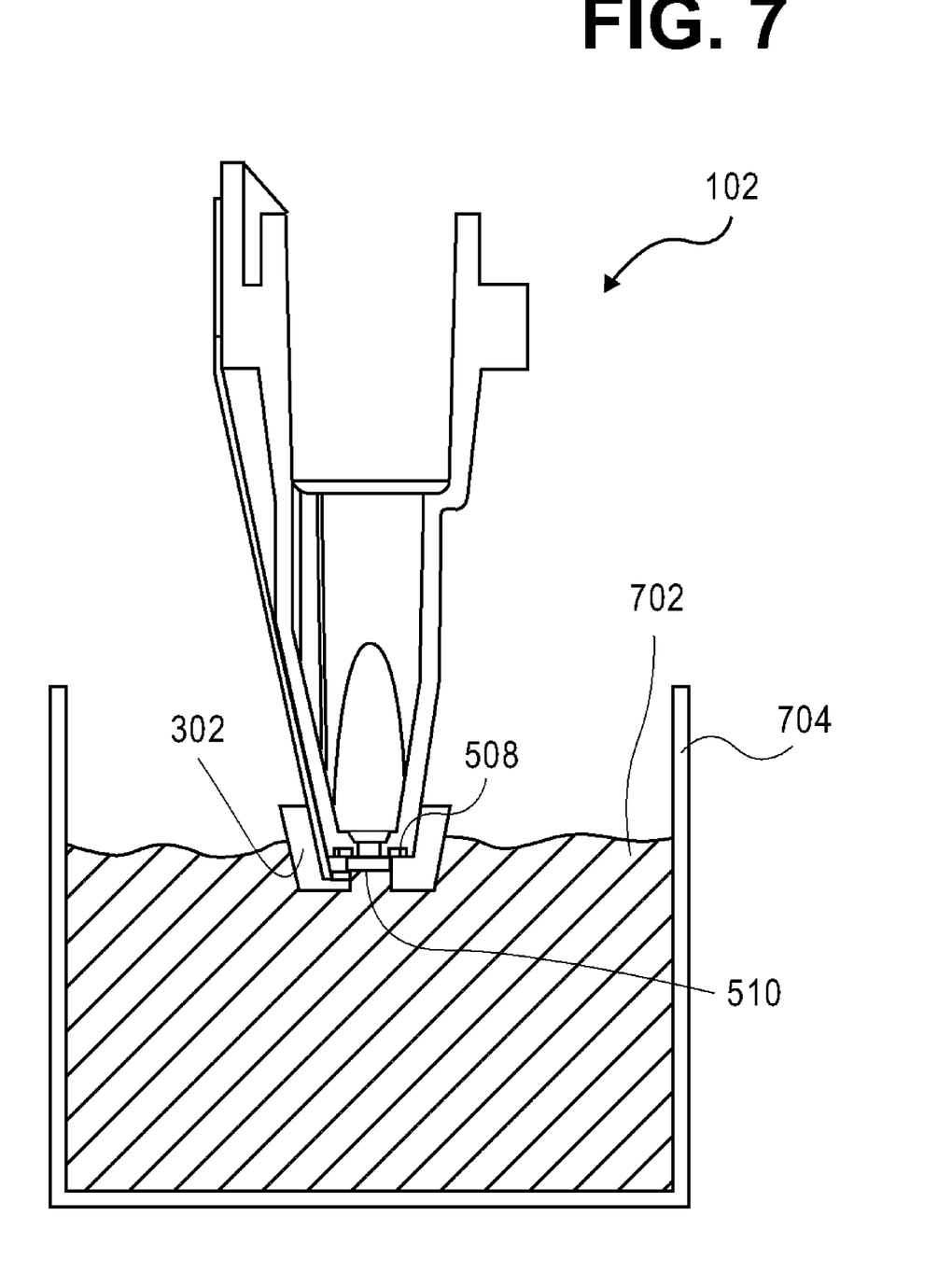
FIG. 7 is a diagram showing how fluid can be aspirated into a removable tip having a cap mounted thereon by dipping the end of the tip into a supply of fluid, according to an embodiment of the invention.

Aspiration of fluid into the removable tip 102 in part 602 can be accomplished in a number of different ways. For instance, the end 508 of the removable tip 102 at which the fluid-ejection mechanism 510 and the cap 302 are disposed may be dipped into a supply of fluid (604), such that at most just the mechanism 510 and the cap 302 come into contact with the fluid. FIG. 7 shows dipping the removable tip 102 into a supply of fluid 702 to aspirate the fluid into the tip 102 in this manner, according to an embodiment of the invention. The supply of fluid 702 is contained within a container 704. The removable tip 102 is inserted into the container 704 until just the cap 302 and the fluid-ejection mechanism 510 at the end 508 of the tip 102 come into contact with the fluid 702. It is noted that the removable tip 102 has been placed on the fluid-ejection device 100, but the device 100 is not depicted in FIG. 7 for illustrative convenience.

As another example, a supply of fluid may be dispensed onto an external surface as a fluid bead (606), and the end 508 positioned relative to the fluid bead so that at most just the fluid-ejection mechanism 510 and the cap 302 come into contact with the fluid bead (608). As before, backpressure within the tip 102 may then result in the fluid being transferred into the tip 102, or natural wicking action may result in the fluid being transferred into the tip 102. If just a relatively small amount of fluid has to be transferred, then dispensing of the supply of fluid as a fluid bead on the external surface may be achieved in part 606 manually by a user, such as by using a pipette or other device. By comparison, if a larger amount of fluid is to be transferred, the dispensing of the supply of fluid may be achieved more automatically, through an orifice within the external surface, to continually replenish the fluid bead.

Figure 8A:
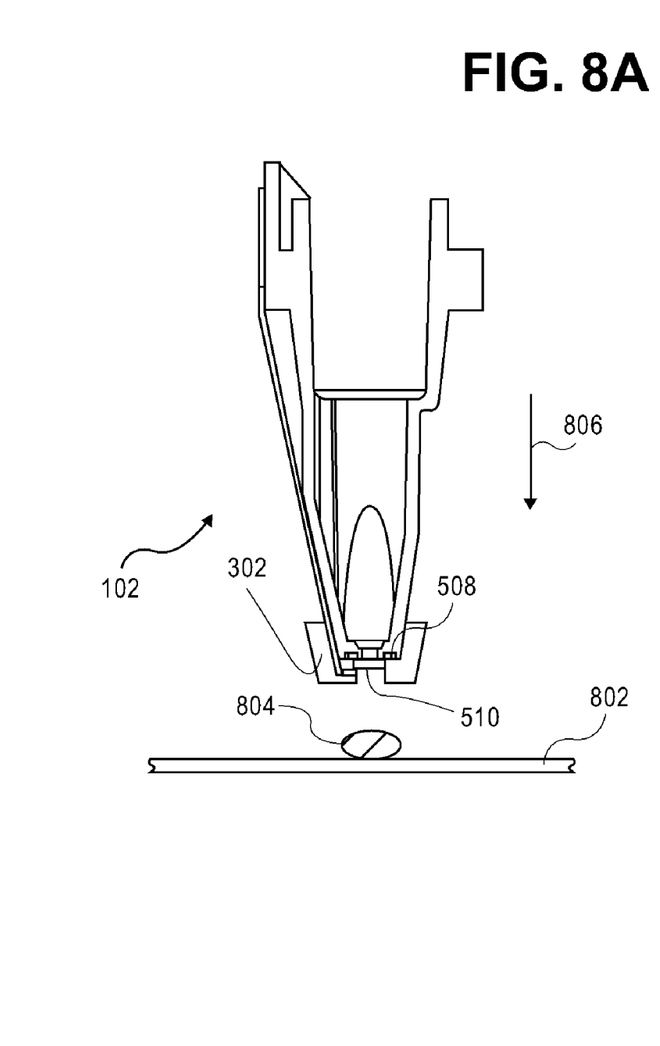
FIGS. 8A and 8B are diagrams showing how fluid can be aspirated into a removable tip having a cap mounted thereon by positioning the end of the tip adjacent to and touching a fluid bead, according to different embodiments of the invention.

FIG. 8A shows positioning the removable tip 102 so that the fluid-ejection mechanism 510 and the cap 302 come into contact with a manually dispensed fluid bead 804, according to an embodiment of the invention. A fluid bead 804 has been manually dispensed onto an external surface 802 by a user using a micropipette or another type of device. The removable tip 102 is positioned over the fluid bead 804 and lowered, as indicated by the arrow 806, until at most just the fluid-ejection mechanism 510 and the cap 302 come into contact with the fluid bead 804. Fluid from the fluid bead 804 then is transferred into the removable tip 102, resulting from backpressure or wicking action. As in FIG. 7, the removable tip 102 in FIG. 8A has been placed on the fluid-ejection device 100, but the device 100 is not depicted in FIG. 7 for illustrative convenience.

Figure 8B:
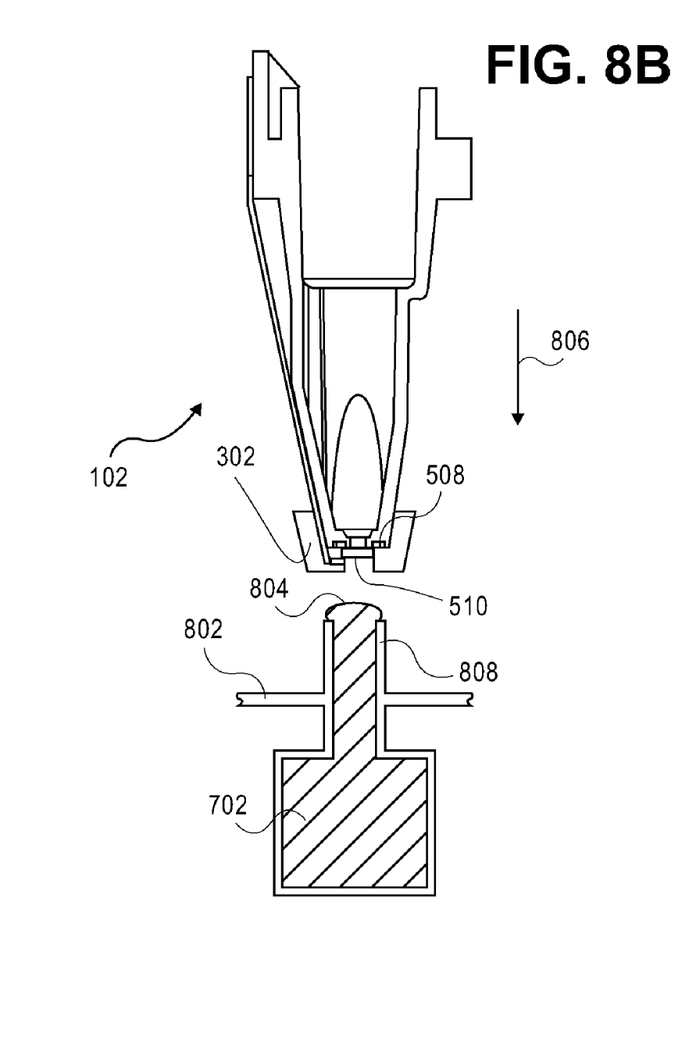

FIG. 8B shows positioning the removable tip 102 so that the fluid-ejection mechanism 510 and the cap 302 come into contact with a continually replenished fluid bead 804, according to an embodiment of the invention. The external surface 802 includes an orifice 808 that exposes the supply of fluid 702. The fluid 702 naturally wicks to the top of the orifice 808 and terminates at the fluid bead 804. The removable tip 102 is positioned over the fluid bead 804 and lowered, as indicated by the arrow 806, until at most just the fluid-ejection mechanism 510 and the cap 302 come into contact with the fluid bead 804. Fluid from the fluid bead 804 is then transferred into the removable tip 102, due to backpressure or wicking action. The fluid bead 804 is at least substantially continually refreshed from the fluid supply 702. As in FIGS. 7 and 8A, the removable tip in FIG. 8B has been placed on the fluid-ejection device 100, but the device 100 is not depicted in FIG. 8B for illustrative convenience.

It is noted that the continually replenished fluid bead embodiment of FIG. 8B is advantageous in that the removable tip 102 does not come into contact with the entire (bulk) supply of fluid 702. In other words, the entire supply of fluid 702 is not exposed to the removable tip 102. In general, aspirating fluid into the removable tip 102 by having the tip 102 come into contact with a bead of fluid is that the location to which the removable tip 102 is to be lowered is known a priori. That is, the tip 102 does not have to be dipped into a supply of fluid, such that the tip 102 is not dipped too far into the fluid supply. Furthermore, the level of fluid within the fluid bead 804 does not vary in the embodiment of FIG. 8B, which also aids in having the removable tip 102 being positioned at the same, known location for aspiration of fluid into the tip 102.

Referring back to FIG. 6, in one embodiment, once the fluid has been aspirated into the removable tip 102 of the fluid-ejection device 100, the fluid can be stored for an extended period of time (609). For instance, the tip 102 may be removed from the fluid-ejection device 100, and then frozen. When the fluid is needed for dispensing, the fluid within the tip 102 is thawed back to a liquid state, and then placed back onto the fluid-ejection device 100. Alternatively, the tip 102 may first be placed back onto the fluid-ejection device 100, and then the fluid thawed back to a liquid state.

Therefore, the fluid-ejection device 100 is moved to a location at which the end 508 of the removable tip is positioned (610). The fluid-ejection device 100 is then caused to eject the fluid from the removable tip 102 at the desired location (612). In one embodiment, prior to ejecting fluid from the removable tip 102 after aspiration of the fluid into the tip 102, the fluid-ejection mechanism 510 of the tip 102 may be wiped or blotted. Because fluid can be ejected from the removable tip 102 in volumes as small as picoliters, the method 600 provides a technique by which such relatively small volumes of fluid can be easily transferred from one location to another, without having to use relatively expensive equipment as is achieved within the prior art. The cap 302 mounted on the tip 102 further substantially reduces or eliminates wastage of the fluid during this fluid transfer process. The fluid can be ejected from the removable tip 102 into a different microtiter plate, wellplate, or another type of microplate. Thus, volumes of fluid ranging from picoliters to microliters can be ejected into such a microplate.

In one embodiment, a wash and rinse process is then performed in relation to the removable tip 102 of the fluid-ejection device 100 (614). The tip 102, after having dispensed an aspirated sample of fluid, is placed into a wash bath, which may be located at a wash station, and the wash fluid of the bath is aspirated into the tip 102 and then ejected from the tip 102. This procedure is performed a number of times to ensure that the removable tip 102 is clean, so as to avoid contamination when a different type of fluid is aspirated into the tip 102. Thus, the method 600 can be repeated at part 602 with a different type of fluid.

We claim:

1. A fluid-ejection device comprising:
   a handheld and/or mountable enclosure;
   a removable tip having a fluid-ejection mechanism located at an end thereof, the removable tip adapted to receive fluid at an end thereof via aspiration responsive to the removable tip touching a supply of fluid external to the fluid-ejection device, the fluid-ejection mechanism adapted to eject the fluid received into the removable tip;
   a cap disposed on the end of the removable tip such that just the fluid-ejection mechanism is exposed through the cap;
   a pneumatic fitting extending from the enclosure and receptive to placement of the removable tip thereon; and,
   a controller situated within the enclosure to cause the removable tip to eject fluid.

2. The fluid-ejection device of claim 1, wherein the fluid-ejection device further comprises an electrical connector extending from the enclosure and receptive to coupling of an electrical connector of the removable tip.

3. The fluid-ejection device of claim 2, wherein the end of the removable tip at which the fluid-ejection mechanism is located is a first end of the removable tip, the removable tip having a second end at which the electrical connector of the removable tip is located, the removable tip including a circuit electrically coupling the electrical connector of the removable tip with the fluid-ejection mechanism.

4. The fluid-ejection device of claim 3, wherein the cap at least substantially covers the circuit at the end of the removable tip that is otherwise exposed.

5. The fluid-ejection device of claim 1, wherein positioning the end of the removable tip of the fluid-ejection device adjacent to and touching the supply of the fluid to aspirate the fluid into the removable tip results in just the cap and the fluid-ejection mechanism coming into contact with the supply of the fluid.

\* \* \* \* \*